June 24, 1958 G. G. LA PORTE 2,840,035
OIL CONDITION TESTING AND INDICATING DEVICE
FOR AUTOMOBILES
Filed June 11, 1956
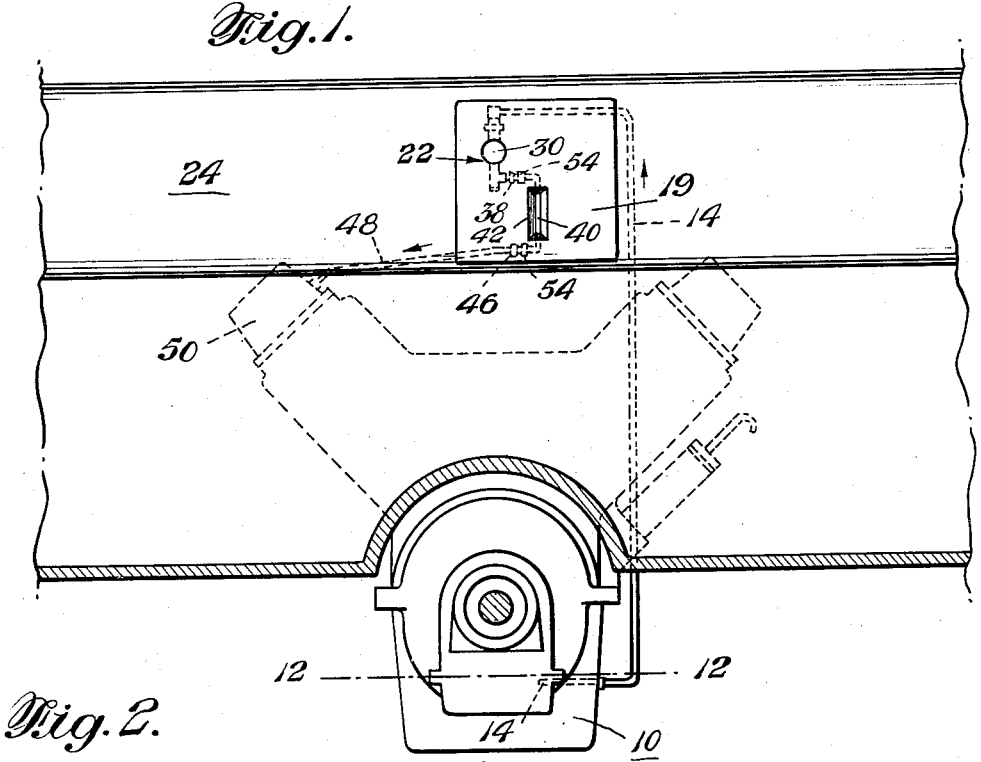
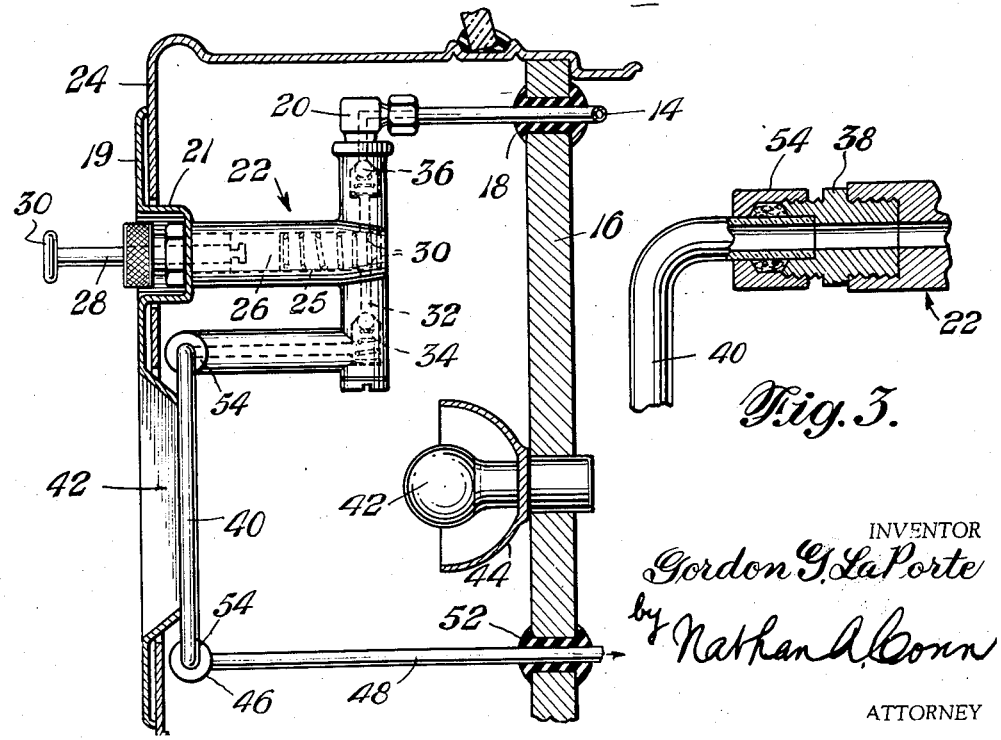
INVENTOR
Gordon G. LaPorte
by Nathan A. Conn
ATTORNEY

2,840,035

OIL CONDITION TESTING AND INDICATING DEVICE FOR AUTOMOBILES

Gordon G. La Porte, Tupper Lake, N. Y.

Application June 11, 1956, Serial No. 590,743

3 Claims. (Cl. 116—118)

This invention realtes to devices for testing and indicating the condition of the oil in the crankcase of an automobile engine.

The principal object of the invention is to provide a testing device of great simplicity, which is reliable in operation, and which may be readily installed on any automobile at a very low cost.

Another object is to provide a device of this character by which a reliable indication of the level of the oil may be obtained and also the condition of the oil ascertained from an indicating device located on the instrument panel of the automobile.

A further object is to provide a device of the above character which may be operated by the driver of the automobile without leaving his seat, while the motor is at rest.

A still further object is to provide an indicating device of the character noted which may be readily taken apart without requiring the use of tools for the purpose of cleaning the sight tube whenever required.

The various further objects and advantages will appear from the following detailed description and the features of novelty will be particularly pointed out in the claims.

In the annexed drawing, illustrating a preferred embodiment of the invention,

Fig. 1 is a rear elevational view illustrating the connections of my improved testing and indicating device with portions of an automobile engine, the adjacent parts of the automobile body being omitted for the sake of clearness.

Fig. 2 is a side elevational view on a larger scale illustrating my improved device installed on the instrument panel of an automobile.

Fig. 3 is a fragmental detail view on an enlarged scale illustrating the sight tube connection with the pump.

In many of the prior devices designed to obtain an indication of the oil level in the crankcase of an automobile engine an attempt was made to utilize the motion of the engine in various ways to assist in securing the indication. This has proved to be unreliable, inasmuch as the motion of the oil in the crank-case while the engine is running makes it impossible to obtain an accurate indication of the oil level. Other devices in the prior art have proved impractical by reason of complicated expensive installation requirements or by reason of reliance on parts which may come out of order after a period of use.

My improved installation avoids all of these defects by the simple inexpensive and reliable installation as described in the preferred embodiment of this invention.

Referring in detail to the drawing, the crank-case 10 of a known type of automobile engine is illustrated as requiring an oil level having a minimum indicated by the line 12—12. To test this level, a tube 14 is introduced into the crank-case, as thru a hole drilled in the side of the casing, at a point adjacent the minimum permissible level, so that the mouth of the entering tube terminates at that level. Tube 14 extends upwardly and passes thru a resilient bushing 18 disposed in a perforation in bulkhead 16 for connection to the inlet end 20 of a suction pump 22 attached to the rear of instrument panel 24, in any suitable manner. Preferably a cover plate 19, mounted on instrument panel 24, has a portion 21 passing thru a slot in the panel wall, providing a portion to which pump 22 may be attached.

Suction pump 22 is formed with a cylinder 25 in which is disposed for reciprocation a piston 26, operated by stem 28 extending thru the instrument panel and terminating in an operating button 30. The plunger is held in retracted position by a spring 31. Thus for operating the pump the operator, sitting in his seat in the automobile, merely presses button 30 to advance piston 26 and then releases the button, allowing spring 31 to return the piston. At each forward movement of the piston any air or oil in cylinder 25 is forced out thru duct 32 past check valve 34, and on the return of the piston by spring 31 suction is exerted to suck in air or oil past upper check valve 36 opening downwards into duct 32. In this way the operator by pushing button 30 several times exhausts the air from tube 14 and, if there is sufficient oil in crank-case 10 so as to maintain a level above the lowest permissible level, oil will be sucked up by pump 22 and forced past check valve 34.

The exit end of pump 22 is connected by means of a packing gland 38 to a transparent sight tube 40, disposed close to a corresponding slot 42 formed in cover plate 19. Thus when the oil is forced past check valve 34 it enters sight tube 40 visible to the operator and gives an indication that the oil in the crank-case is above the permissible minimum level. Should no oil be visible in sight tube 40 after several repicrocations of piston 26 by pressing button 30, the operator is put on notice that the oil in the crank-case is insufficient for safety and requires replenishing.

In addition to giving him information in regard to the level of the oil the operator may also determine the condition of the oil, as to its clearness, indicating whether the oil has accumulated sludge due to its repeated use, thus requiring a change of oil. To facilitate the inspection of the condition of the oil a light 42 with a reflector 44 is provided to throw a beam of light thru sight tube 40, illuminating the same so that the degree of translucence or opacity of the oil in the sight tube can be readily determined.

For disposing of the oil passing thru the sight tube, the lower extremity of the latter is connected in a suitable manner, as by a packing gland 46, to a tube 48, passing back thru bulkhead 16 and discharging into the valve rocker chamber enclosed by cover plate 50. Thus any oil entering sight tube 40 is readily drained and does not interfere with the accuracy of any subsequent test. A suitable resilient bushing 52 may be supplied for the tube to provide a tight cushioned fit for tube 48 similar to that produced by bushing 18 for tube 14.

Should it be desired to clean sight tube from time to time, so as to restore its original transparency, in the event that the repeated tests of the oil has left any sludge coating on the interior walls of the tube, the latter may be readily removed by manipulating the knurled nuts 54 to disengage the same from the mating units of the respective glands. Thus the sight tube may be readily detached without requiring any special tools for this purpose.

It will thus be seen that I have provided an extremely simple, easily installed reliable test device that accurately tests the level of the oil in the crank-case of an automobile engine. The device does not require any mechanical motor means for its operation but is operated manually by the driver while in his seat by a few push strokes of a button on the instrument panel. The type of pump used is very reliable in operation and will operate effectively for at least the life of the automobile on which it is installed, The oil that is pumped up is restored to the engine where it may help to lubricate parts thereof. The device not only tests the level of the oil but also its opacity or translucence. In this latter test, should it be desired to clean the sight tube for better inspection of the oil, this may be readily accomplished by the driver without requiring any tools for removing the sight tube and replacing it in position.

Having thus described my invention, I claim:

1. A device for testing the level of oil in the crank-case of an automobile engine comprising a suction pump attached to the rear of the instrument panel of an automobile, an inwardly opening check valve disposed at the intake duct of said pump and an outwardly opening check valve disposed at the outlet duct of said pump, conduit means connecting the intake end of the pump with the oil chamber in the crank-case of the engine, the entrance mouth of said conduit terminating above the point of minimum permissible level in said crank-case, a vertical sight tube disposed at the rear of said instrument panel and exposed to view at the front of said panel thru a slot therein, means connecting the discharge end of said pump to the top of said sight tube, conduit means connecting the other end of said sight tube with a chamber in said engine requiring lubrication located at a level below the discharge end of said sight tube, operating means for said pump comprising a cylinder, a piston therein and a piston rod connected to said piston and extending thru said instrument panel to the front thereof, whereat it may be operated by a person while seated in the automobile, whereby a few strokes of said piston rod exhausting the air in said first mentioned conduit suffices to draw oil from the crank-case to discharge for inspection thru the sight glass to indicate a safe level of oil, when said level is above said mouth of said conduit, said conduit means connecting the bottom end of said sight tube to an engine chamber serving to drain the oil from the sight tube to clear the same for another test.

2. A device for testing the level of oil in a crank-case of an automobile engine as defined in claim 1, wherein a spring is disposed in said cylinder and adapted to return the pump piston to inoperative position after the piston rod is pressed into the cylinder and released by the operator.

3. A device for testing the level of oil in the crank-case of an automobile engine, comprising a suction pump attached to the rear of the instrument panel of an automobile, conduit means connecting the intake end of the pump with the oil chamber in the crank-case of the engine, the entrance mouth of said conduit terminating above the point of minimum permissible level in said crank-case, a vertical sight tube connected at the top end thereof to the exit end of said pump, said sight tube being disposed at the rear of said instrument panel and exposed to view at the front of said panel thru a slot therein, conduit means connecting the bottom end of said sight tube with a chamber in said engine requiring lubrication located at a level below the discharge end of said sight tube, illuminating means disposed at the rear of the sight tube, whereby the opacity or translucence of oil passing thru said sight tube may be determined by inspection, the extremities of said sight tube being horizontally bent in the same direction, means for detachably connecting said extremities of the sight tube respectively to the discharge end of said pump and to the second mentioned conduit means, comprising a knurled nut at each extremity of the sight tube manually operable to compress packing around the extremities of the sight tube and to join the same in an oil tight connection to said discharge end of the pump and to said second mentioned conduit, whereby the sight tube may be readily removed for cleaning.

References Cited in the file of this patent

UNITED STATES PATENTS

| 1,396,529 | Rudolph | Nov. 8, 1921 |
| 1,806,423 | Shapiro | May 19, 1931 |
| 1,950,134 | Bradbury | Mar. 6, 1934 |
| 2,333,397 | Thiemer | Nov. 2, 1943 |